Oct. 3, 1933.  G. E. OSBORNE  1,929,286
ANIMAL TRAP
Filed Oct. 10, 1930
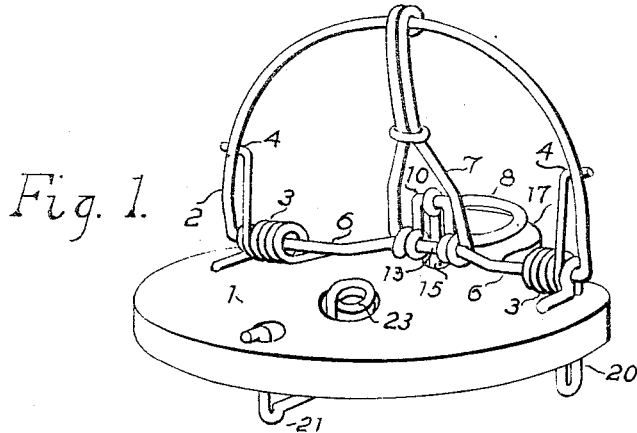
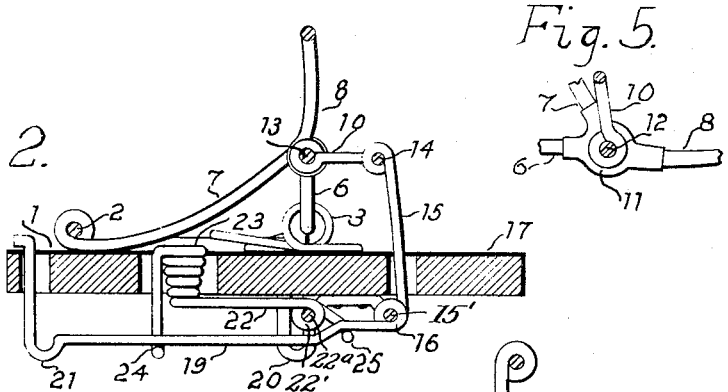
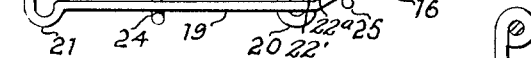
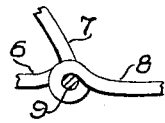
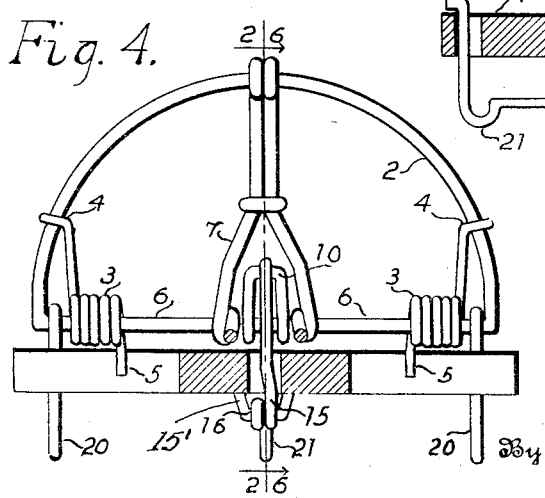
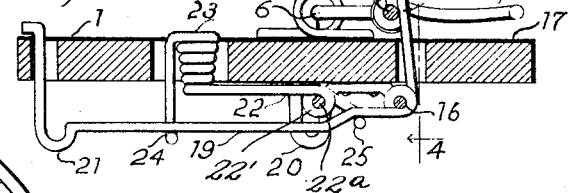
Inventor
Guy E. Osborne
By
Attorney Patented Oct. 3, 1933

1,929,286

UNITED STATES PATENT OFFICE 1,929,286

ANIMAL TRAP

Guy E. Osborne, Chauncey, Ohio

Application October 10, 1930. Serial No. 487,828

12 Claims. (Cl. 43—81)

This invention relates to improvements in traps for catching mice, rats, muskrats, minks and the like and possesses several distinctive advantages over the steel-trap and other devices generally employed to procure such small wild animals.

An important object of the invention is the provision of semi-automatic means whereby the trap is latched with ease, and perfect safety to the operator whose hands are not required to be placed within the danger zone of the device, and which permits of an extremely sensitive adjustment in which there is no possibility of the trap being set so tightly as to prevent a sure and easy actuation.

A humantarian object of the invention contemplates a device whereby death to the animal is presumed to be virtually instantaneous, thereby presenting no opportunity for prolonged cruelty to the animal because of mangled legs and, frequently, the extended privation of food and water.

A further object of the invention is the provision of means which facilitate removal of the dead animal without the trapper having to touch the same or necessarily that part of the trap with which the animal has come in contact. This sanitary feature of the device is particularly of inestimable value whenever employed in the catching of mice, rats or other animals which transmit filthy, dangerous contamination.

A still further object of the invention presents a simple combination of elements which can be coadapted in various sizes to meet all reasonable requirements.

It is believed that the device will also save the fur-trapper the usually numerous uneconomic losses for the especial reason that there is remote possibility of the animal's escape and no opportunity for it to mutilate its fur-bearing properties.

With the foregoing and other objects in view, the invention consists in details of construction and combination of parts to be hereinafter described and set forth in the subjoined claims.

In describing the invention in detail, reference will be had to the accompanying drawing, wherein like characters of reference denote corresponding parts in the several views, and in which, Figure 1 is a perspective view showing the trap in a set adjustment.

Figure 2 is a longitudinal sectional view taken substantially on the line 2—2 of Fig. 4, looking in the direction indicated by the arrows, and shows the relative position of the actuator and correlated parts when the trap is in a sprung adjustment.

Figure 3 indicates an optional method of securing the transverse, stabilizing and thumb-lever elements of the jaw in fixed relation.

Figure 4 is the rear elevation showing the relative arrangement of the reciprocating arm, connecting yoke, stabilizing braces and the circumflected jaw, when the trap is in the set adjustment; the transverse sectional view being taken substantially on the line 4—4 of Fig. 6, looking in the direction indicated by the arrows.

Figure 5 indicates another optional method of securing the constituent elements of the jaw and the thumb-lever in rigid relation by the use of a three-way sleeve, provision being had for rotative mounting of the connecting yoke.

Figure 6 is a longitudinal sectional view taken substantially on the line 6—6 of Fig. 4, looking in the direction indicated by the arrows, and shows the relative position of the actuator and coadapted parts when the trap is in a set adjustment.

Figure 7 indicates an optional method of coadapting the actuator and reciprocator, by the use of a step-cut joint, whenever a two piece construction is desired.

The trap comprises a rigid base 1 which may be wood, sheet-metal or fabricated wire construction and substantially semi-circular in contour, upon which there is coadjacently hinged a similarly shaped jaw 2, the base being elevated slightly above a floor or other supporting surface as indicated in the accompanying drawing.

Concentrically arranged with the jaw 2 are coil springs 3 which engage the jaw 2, as at 4, the opposite end 5 being terminated at the rear of the base, as shown in Fig. 4, thereby providing means for the impact between the base and the jaw 2 whenever the latter is released from the secured or set position illustrated in Figs. 1 and 6.

It will be noted that the transverse member 6, associated with the jaw 2, is off-set crank-like substantially at a right angle to the plane of the jaw and conjoined to the circumflected portion of the jaw with hypotenusical braces which stabilize and secure these constituent elements in fixed angular relationship.

It will also be observed that the stabilizers 7 have an extended portion 8 adapted as a thumb-lever by which the jaw 2 is adjusted to a desired position. If preferred, the thumb-lever 8 may be an extension of the cross-member 6, see Fig. 3, in which arrangement a transverse portion 9 of the stabilizer 7 provides suitable means for the rotative mounting of the connecting yoke 10 illustrated in each of the other drawings.

A very satisfactory method of adapting the thumb-lever 8 is indicated in Fig. 5, showing that a three-way sleeve 11 embraces portions of the three component parts 6, 7 and 8, and that a transverse portion 12 of the lever 8 provides very suitable mounting for the connecting yoke 10 presently to be described. It is evident that the sleeve 11 also permits the use of the element 6 or 7 as a bearing for the connecting yoke 10, or a short pintle may be substituted if more desirable.

The connecting yoke or link 10 is rotatively mounted upon the off-set portion 13 of the transverse member 6 and engages the upper end of the reciprocating arm 15 which extends downward through the base 1 and is attached thereto at the coil bearing 16 shown in Figs. 2, 4 and 6 of the accompanying illustrations.

Integral with the base 1 and the jaw 2, see Fig. 2, are the finger piece 17 and thumb lever 8, respectively, which are manually forced into juxtaposition as indicated in Fig. 6. During this adjustment an arc will have been described simultaneously by the transverse crank portion 13, which conveys the connecting yoke 10, in a rearward-downward direction to a point of contact 18 with the reciprocating arm 15. In this position the bearing 14 is slightly in advance of dead-center, respective to the coil bearing 16, as indicated. The resistance through the elements 10, 13 and 15 to the bearing 16 thus flows downward in an imperceptible curve; the jaw 2 being held in its set adjustment while this fragile poise remains undisturbed.

It will be clearly understood that the line of resistance is very easily broken by an imperceptible rearward movement of the reciprocator at the bearing 14. There being no impediment in the actuation, the jaw 2 is thereby released from the secured or set adjustment instantaneously.

It is evident that this is a simple, stable, but sensitive mechanism which is adequate for the desired adjustments, stay and actuation of the jaw, and which eliminates a necessity for placing the fingers in a danger zone as will be clearly observed in the following described manner of setting the trap.

Referring to Fig. 2, the actuating lever 19 may be placed between the thumb and fingers of the left hand, for example, the former being inserted between the lever and the base. The index-finger of the right hand is then placed beneath the base projecting finger-piece 17 and the thumb-lever 8 forced downward to the limit, at which position a slightly greater separation of the actuator 19 and the base 1 at the front is made to throw the reciprocator 15 and connecting yoke 10 forward into latched position as indicated in Fig. 6 of the drawing.

If preferred, the trap may be set also with equal facility by permitting the point of the right thumb, for example, to strike the reciprocating arm 15 as the thumb lever 8 is brought downward into position, the sensitiveness of actuation of the device remains wholly unaffected by the amount of force applied to the elements 10, 13 and 15 in the final adjustment.

Ample finger accessibility is provided, by the legs 20, to minimize shock in the initial contact with the supporting surface and permits the actuator leg 21 to make the final contact more easily. Since the base 1 is tipped downward at the front lastly, there need be no especial precaution nor fear of premature actuation of the trap when placed in location.

The actuating lever 19 which extends longitudinally of the base 1, from the bearing stable or support 15' and the said lever is coiled as at 16 to receive the staple, and is terminated at the front of the reverse side, is preferably integral with the reciprocating arm 15 but may be a separate element so as to permit an inflexible material to be used in their construction if desired; in which arrangement, see Fig. 7, the lever 19 and the arm 15 may be mutually adapted, similarly as a step-cut joint indicated at 26, near the junction of their axis so as to permit no upward motion of the actuating lever 19 when not accompanied by the necessary rearward shifting of the reciprocating arm 15 when the trap is in set adjustment.

It will be understood that whether the actuator 19 and reciprocator 15 are integral or of coadaptable design approximately one third the weight of the trap is transmitted to the actuator contact point 21. Minimum energy is therefore required at the trigger for actuation of the trap.

Referring to Figs. 2 and 6, it will be seen that the trigger 22, has a coil 22' mounted on a staple or support 22ª secured to the base 1 similarly as the actuator 19, is provided at its front with a bait receptacle 23 and at both its front and rear with laterally disposed arms 24 and 25, respectively, which engage the actuator in the manner indicated. It will also be observed, that the trigger 22 is fulcrumed between its ends and will therefore transmit energy to the actuating lever 19 whether the effort to procure the bait at the receptacle 23 is applied in an upwardly or downwardly direction.

It is seen that the trigger 22 has a hook 24 which underlies the lever 19 on one side of the pivot or staple 22ª and another extension or hook 25 which underlies the said trigger on the side of the pivot or staple 22ª opposite that of the hook 24. It follows, therefore, that if in attacking the bait in the bait holder 23 an upward pull is applied to the bait it will lift the trigger 22, thus causing the hook 24 to lift the lever 19 whereas if in attacking the bait downward pressure is exerted, the hook or extension 25 will cause the lever 19 to swing upwardly on its pivot and in either instance when sufficient movement is imparted to the lever 19 the trap will be sprung.

It must be understood that only a preferred embodiment of my invention is herein shown and described and that any departure from the same, such as size, shape or arrangement of parts, may be resorted to without departing from the spirit of the invention or the scope of the subjoined claims.

What I claim and desire to secure by Letters Patent of the United States is:

1. A trap including a base provided with a suitable projecting finger-piece, a spring-actuated jaw, means for attaching the jaw hingedly to the base, a portion of said means extending downward and operative to support the base at its rear, when the trap is set.

2. A trap including a suitable base, a spring-actuated jaw hingedly mounted thereon, a rotative transverse crank-like element offset angularly respective to the plane of the jaw and attached thereto, and coacting to move and stay the jaw, relative to the base, as the trap is set.

3. A trap including a suitable base, a spring-actuated jaw, a rotative transverse element attached to the jaw and offset angularly respective to the plane thereof, said transverse element having an extended thumb-lever portion for moving the jaw, relative to the base, when operated to set the trap.

4. A trap including a suitable base, a spring-actuated jaw, means for attaching the jaw hingedly to the base, a rotative transverse element offset angularly respective to the plane of the jaw and attached thereto, and a thumb-lever operative to be secured in fixed relation to the said transverse element for moving the jaw, relative to the base, when the trap is set.

5. A trap including a suitable base, a spring-actuated jaw secured hingedly to the base said jaw having a circumflected portion, a transverse crank-like element of the jaw offset angularly respective to the plane thereof, a thumb-lever, and stabilizing elements for conjoining the crank-like and circumflected portions of the jaw in fixed relation for synchronizing the movement thereof, relative to the base, when operated to set the trap.

6. A trap including a suitable base, a spring-actuated jaw attached hingedly to the base said jaw having a circumflected portion, a transverse crank-like element attached to the jaw and offset angularly respective to the plane thereof, stabilizers for securing the crank-like and circumflected elements of the jaw in fixed relation, said stabilizers having an extended thumb-lever portion for moving the jaw, relative to the base, when operated to set the trap.

7. A trap including a suitable base, a spring-actuated jaw secured hingedly to the base said jaw having a circumflected portion, a transverse crank-like element offset substantially at a right angle respective to the plane of the jaw and attached thereto, stabilizing means for conjoining the crank-like and circumflected portions of the jaw, and a thumb-lever secured in rigid relation to the said stabilizers for moving the jaw, relative to the base, when the trap is operated to set position.

8. A trap including a suitable base, a spring-actuated jaw secured hingedly to the base, a transverse crank-like member offset substantially at a right angle to the plane of the jaw and attached thereto, stabilizers for conjoining the constituent elements of the jaw, and a thumb-lever secured rigidly thereto for creating coordinated movement thereof, relative to the base, when operated to set the trap.

9. A trap including a suitable base, a spring-actuated jaw comprising transverse crank-like and circumflected elements, means for securing the jaw hingedly to the base, means for elevating the base at its rear, correlated constituent elements for moving the jaw relative to the base, an actuating lever extending longitudinally of the base and fulcrumed between its ends thereto and provided integrally with an upwardly-extending reciprocating arm, said lever having resiliency and operative to support the base at its front, when the trap is set.

10. A trap including a suitable base, a spring-actuated jaw having transverse and circumflected portions, stabilizers for securing the transverse and circumflected portions of the jaw in fixed relation, accessible finger pieces for creating relative movement of the jaw and base, a transverse crank-like element offset substantially at a right angle to the plane of the jaw, a vertically extending reciprocating arm, and a rotatively mounted connecting yoke or link for conjoining the said crank-like and reciprocating elements, the yoke and said component parts comprising substantially the means for securing the jaw, when the trap is set.

11. A trap including a suitable base, a spring-actuated jaw provided with diagonally extending stabilizers, projecting finger pieces, a longitudinally extending actuating lever for supporting the base at its front, means operable by the movement of said lever for maintaining and/or destroying the poise creatable by said means, a trigger extending longitudinally of the base and fulcrumed between its ends thereon and provided with a bait receptacle at its front and at both its front and rear with transverse lateral portions arranged to engage the aforesaid lever in the vertical movements of the said receptacle, for actuating the jaw, when the trap is set.

12. A trap including a suitable base, a spring-actuated jaw, circumflected, transverse elements secured in substantially triangular arrangement, as viewed in cross-section respective to the plane of the jaw, a thumb-lever for moving the jaw relative to the base, a rotatively mounted connecting element, a trigger fulcrumed between its ends and provided with portions projecting laterally and a bait receptacle, a longitudinally extending actuator pivoted to the base at the rear and provided with a leg to support the base at its front, a reciprocator pivoted to the base and extending upwardly therefrom and arranged to move longitudinally, the said actuating and reciprocating elements having coactive joints near the junction of their axis so as to permit the greater movement of the reciprocator, relative to the actuator, substantially as and for the purpose described.

GUY E. OSBORNE.